(12) United States Patent
Lee et al.

(10) Patent No.: US 10,136,298 B2
(45) Date of Patent: Nov. 20, 2018

(54) DEVICE-TO-DEVICE CONTENT DELIVERY METHOD THROUGH INTERWORKING WITH SERVICE CONTROL APPARATUS

(71) Applicant: SK Telecom Co., Ltd., Seoul (KR)

(72) Inventors: Jongmin Lee, Seoul (KR); Kyungjun Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 31 days.

(21) Appl. No.: 15/416,393

(22) Filed: Jan. 26, 2017

(65) Prior Publication Data

US 2017/0134927 A1 May 11, 2017

Related U.S. Application Data

(63) Continuation of application No. PCT/KR2015/007881, filed on Jul. 28, 2015.

(30) Foreign Application Priority Data

Jul. 30, 2014 (KR) .......................... 10-2014-0097349

(51) Int. Cl.
*H04W 8/00* (2009.01)
*H04W 24/02* (2009.01)
(Continued)

(52) U.S. Cl.
CPC .............. *H04W 8/005* (2013.01); *H04W 4/00* (2013.01); *H04W 8/00* (2013.01); *H04W 12/06* (2013.01);
(Continued)

(58) Field of Classification Search
CPC ...... H04W 8/005; H04W 12/06; H04W 24/02
See application file for complete search history.

(56) References Cited

U.S. PATENT DOCUMENTS

2002/0147004 A1* 10/2002 Ashmore ............ H04M 3/4938
455/414.2
2012/0290650 A1* 11/2012 Montuno ................ H04W 4/80
709/204
(Continued)

FOREIGN PATENT DOCUMENTS

JP 2010-200026 A 9/2010
JP 2012-227581 A 11/2012
(Continued)

OTHER PUBLICATIONS

Extended European Search Report dated Jul. 24, 2017 from European Patent Office in connection with the counterpart European Patent Application No. 15827666.7.
(Continued)

*Primary Examiner* — Ronald B Abelson
(74) *Attorney, Agent, or Firm* — Hauptman Ham, LLP

(57) ABSTRACT

The present disclosure relates to a method for transmitting content between terminals through a service control device link. To this end, A method for content delivery between devices through interworking with a service control apparatus, the method performed by a device, the method comprising: creating a neighboring device list containing connectable neighboring devices by searching for the connectable neighboring devices; transmitting, to the service control apparatus via a network, the created neighboring device list and a domain query message for content; receiving, from the service control apparatus and as a response to the transmitted domain query message, information on a content providing device for providing the content among the connectable neighboring devices contained in the neighboring device list; and requesting and receiving the content from the content providing device.

10 Claims, 7 Drawing Sheets

(51) Int. Cl.
*H04W 4/00* (2018.01)
*H04W 88/18* (2009.01)
*H04W 12/06* (2009.01)
*H04W 92/20* (2009.01)

(52) U.S. Cl.
CPC ........... *H04W 24/02* (2013.01); *H04W 88/18* (2013.01); *H04W 92/20* (2013.01)

(56) References Cited

U.S. PATENT DOCUMENTS

| | | | |
|---|---|---|---|
| 2014/0185529 A1 | 7/2014 | Lim et al. | |
| 2016/0128123 A1* | 5/2016 | Li | H04W 72/08 370/252 |
| 2017/0135055 A1* | 5/2017 | Seo | H04W 56/002 |

FOREIGN PATENT DOCUMENTS

| | | |
|---|---|---|
| KR | 10-2011-0045923 A | 5/2011 |
| KR | 10-2013-0105039 A | 9/2013 |
| KR | 10-2014-0068088 A | 6/2014 |
| KR | 10-2014-0078062 A | 6/2014 |
| WO | 2012/152224 A1 | 11/2012 |

OTHER PUBLICATIONS

Japanese Office Action dated Nov. 14, 2017 for corresponding Japanese Patent Application No. 2017-505545.
International Search Report dated Nov. 26, 2015 corresponding to International Application No. PCT/KR2015/007881.

* cited by examiner

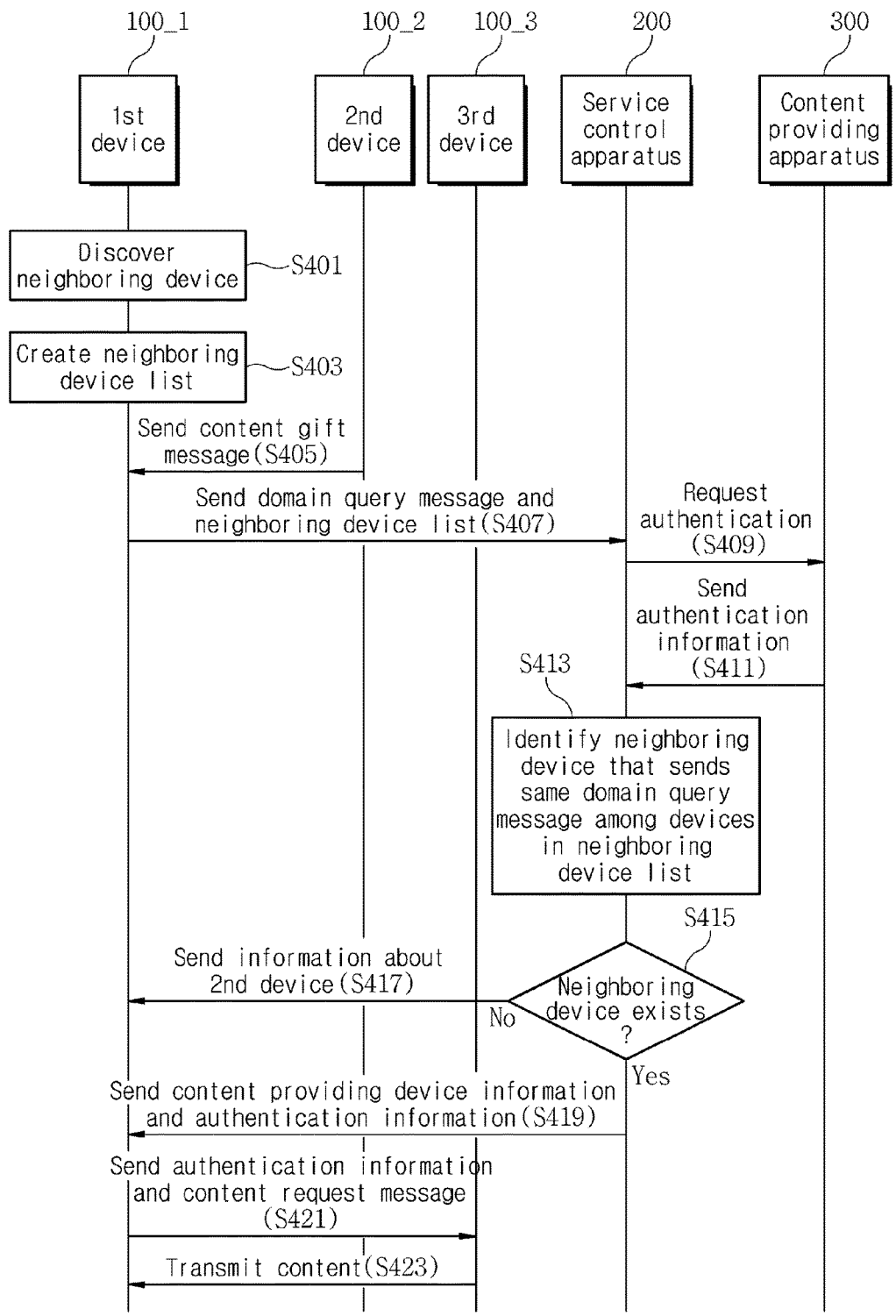

DEVICE-TO-DEVICE CONTENT DELIVERY METHOD THROUGH INTERWORKING WITH SERVICE CONTROL APPARATUS

CROSS REFERENCE TO RELATED APPLICATION

This application is a continuation of International Application No. PCT/KR2015/007881, filed Jul. 28, 2015, which claims the priority to and benefit of Korean Patent Application No. 10-2014-0097349, filed on Jul. 30, 2014 in Korea. The disclosures of above-listed applications are hereby incorporated by reference in their entirely

TECHNICAL FIELD

The present disclosure relates to a method for content delivery between devices through interworking with a service control apparatus

BACKGROUND

The statements in this section merely provide background information related to the present disclosure and do not necessarily constitute prior art. With the development of communication devices and systems, users need a service which allows the user to easily obtain or share desired information at any time. With the recent advent of a smart phone and a tablet PC, an environment which allows the user to obtain and share various kinds of information through a communication system has been already constructed. However, the inventor(s) has experienced that the communication system has a problem of failing to effectively provide real-time information due to system complexity or time delay.

The Device-to-Device (D2D) communication refers to communication technology capable of establishing a direct communication link and transmitting data between devices without using infrastructures such as a base station when the devices are located within a close range from each other.

In this D2D communication, a device finds any other physically neighboring device and establishes a communication session, thus having advantages of solving a traffic overload issue by dispersing traffic concentrated on the base station. Nonetheless, the inventor(s) has experienced that the D2D communication has a problem in having to perform complicated several procedures in which a device supporting a D2D communication module searches for other neighboring devices, sends a query about desired content to all the discovered other devices, receives responses, sends again a request for the content to specific other device identified as having the content, and then receives the content.

Also, the inventor(s) has experienced that the D2D communication technology has another problem in that it may be incapable of supporting a processing method for content—paid content purchased by a device user, content received as a gift from other device user, and the like—which requires authentication.

SUMMARY

In some embodiments of the present disclosure, a method for content delivery between devices through interworking with a service control apparatus, the method performed by a device, the method comprising: creating a neighboring device list containing connectable neighboring devices by searching for the connectable neighboring devices; transmitting, to the service control apparatus via a network, the created neighboring device list and a domain query message for content; receiving, from the service control apparatus and as a response to the transmitted domain query message, information on a content providing device for providing the content among the connectable neighboring devices contained in the neighboring device list; and requesting and receiving the content from the content providing device.

In some embodiments of the present disclosure, a method for content delivery between devices through interworking with a service control apparatus, the method performed by the service control apparatus, the method comprising: receiving, from a device among the devices, a neighboring device list and a domain query message for content; checking whether a neighboring device, which sends the same domain query message as the received domain query message within a predetermined time, is contained in the neighboring device list; and when the neighboring device is contained in the neighboring device list, designating the neighboring device as a content providing device, and transmitting, to the device and as a response to the received domain query message, information on the content providing device; and when the neighboring device is not contained in the neighboring device list, transmitting, as a response to the received domain query message and to the device, address information on a content providing apparatus for the content.

BRIEF DESCRIPTION OF THE DRAWINGS

FIG. 8 is an exemplary flow diagram illustrating a method for content delivery between devices through interworking with a service control apparatus according to one or more embodiments.

DETAILED DESCRIPTION

Figure 1:
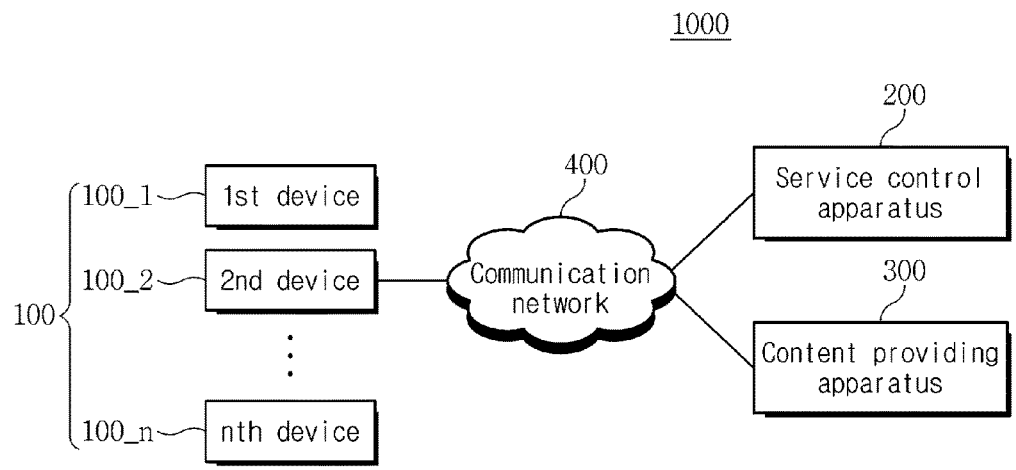
FIG. 1 is an exemplary diagram schematically illustrating main elements of a system according to one or more embodiments.

FIG. 1 is an exemplary diagram schematically illustrating main elements of a system according to one or more embodiments.

Referring to FIG. 1, the system 1000 according to one or more embodiments of the present disclosure supports a communication manner between a plurality of devices 100_1-100_n and, particularly, supports communication between the devices 100_1-100_n through interworking with a service control apparatus 200. Also, in case of impossible communication between the devices 100_1-100_n, e.g., when other devices 100_2, . . . , 100_n adjacent to the first device 100_1 have no content required by the first device 100_1, and the like, the system 1000 according to one or more embodiments of the present disclosure may provide content to the first device 100_1 through a content providing apparatus 300 having the content.

Schematically describing each element, the plurality of devices 100_1-100_n refers to user devices capable of transmitting or receiving data in response to users' manipulations. Particularly, the device 100 according to one or more embodiments of the present disclosure may support direct transmission/reception of content between devices in a D2D communication manner without passing through a communication network 400. Namely, the device 100 according to one or more embodiments of the present disclosure create a neighboring device list by searching for at least one or more connectible neighboring devices, and then transmit the list to the service control apparatus 200 together with a domain query message. Also, the device 100 may receive, from the service control apparatus 200, information about a content providing device capable of providing content from among neighboring devices, send a request for the content to the content providing device, and receive the content.

Additionally, the device 100 of the present disclosure may transmit or receive various kinds of information to or from the service control apparatus 200 and the content providing apparatus 300 through the communication network 400. For this, the device 100 of the present disclosure may include a memory for storing a browser for transmission/reception of information, a program and a protocol, a microprocessor for performing calculation and control by executing various kinds of programs, and the like.

The service control apparatus 200 performs a function of controlling content delivery between the devices 100_1-100_n. Particularly, the service control apparatus 200 according to one or more embodiments of the present disclosure has a domain name server (DNS) function and may perform a process of checking whether there is a neighboring device that transmits the same domain query message for control of content transmission/reception between the devices 100_1-100_n. Describing based on the drawings, when a domain query message regarding content is transmitted from the first device 100_1, the service control apparatus 200 selects, from among neighboring devices of the first device 100_1, a neighboring device that transmits a query message regarding the same domain name as that queried by the first device 100_1, and guides the selected device to the first device 100_1, rather than returning an address of the content providing apparatus 300 corresponding to the domain name.

Main elements and operating method of the device 100 and of the service control apparatus 200 will be described below in detail. A processor equipped in the device 100 and in the service control apparatus 200 according to one or more embodiments of the present disclosure processes program commands for performing a method of the present disclosure. This processor may be a single-threaded processor in one embodiment and a multi-threaded processor in another embodiment. Further, this processor may process commands stored in a memory or storage.

The system 1000 according to one or more embodiments of the present disclosure may be configured to include the content providing apparatus 300. The content providing apparatus 300 performs a function of providing content to the device 100. If there is no neighboring device of the first device 100_1 that requests content, or if there is no neighboring device having the content requested by the first device 100_1, the first device 100_1 may receive the content from the content providing apparatus 300 by request.

Additionally, the devices 100 and the service control apparatus 200 according to one or more embodiments of the present disclosure transmits or receive information through the communication network 400. Similarly, the devices 100 and the content providing apparatus 300 may transmit or receive information via the communication network 400.

The communication network 400 may use various forms of communication networks, for example, wireless communication manners, such as WLAN (Wireless LAN), Wi-Fi, Wibro, Wimax, and HSDPA (High Speed Downlink Packet Access), or wired communication manners, such as Ethernet, xDSL (ADSL, VDSL), HFC (Hybrid Fiber Coaxial cable), FTTC (Fiber to the Curb), and FTTH (Fiber to the Home). Meanwhile, the communication network is not limited to the above examples and may use any other communication manner well known or to be developed.

The communication network 400 may be formed including a plurality of access networks for supporting communication access, and a core network. The core network supports connection between the access networks and may support connection between one or more access networks and any other communication network. The core network may be formed to have a serving gateway (not shown), a PDN gateway (not shown), mobility management device (not shown), and the like. Since these elements are well known, detailed description will be omitted. The core network of the present disclosure may be implemented as an IP network, for example.

One or more access networks each of which has different communication coverage may be connected to the device 100 located in corresponding communication coverage and transmit or receive information. The access network may be connected to the device 100, based on various communication manners, e.g., optical communication, Wi-Fi communication, mobile communication, and the like. Also, the access network may be implemented to include one or more base station apparatuses which not only detect the device 100 approaching the communication coverage, but also perform an access control and radio resource allocation for the access-requesting device 100, information transmission/reception of the device 100 through allocated radio resource, and the like. The base station apparatus may be, for example, eNB (e Node B) in the LTE standard, and Wi-Fi AP (Access Point).

The device 100 according to one or more embodiments of the present disclosure is configured to include an interface module that supports a D2D communication function. If the interface module that supports the D2D communication function is activated, the device 100 searches for one or more connectible neighboring devices and creates a neighboring device list.

This will be described with reference to FIG. 2.

Figure 2:
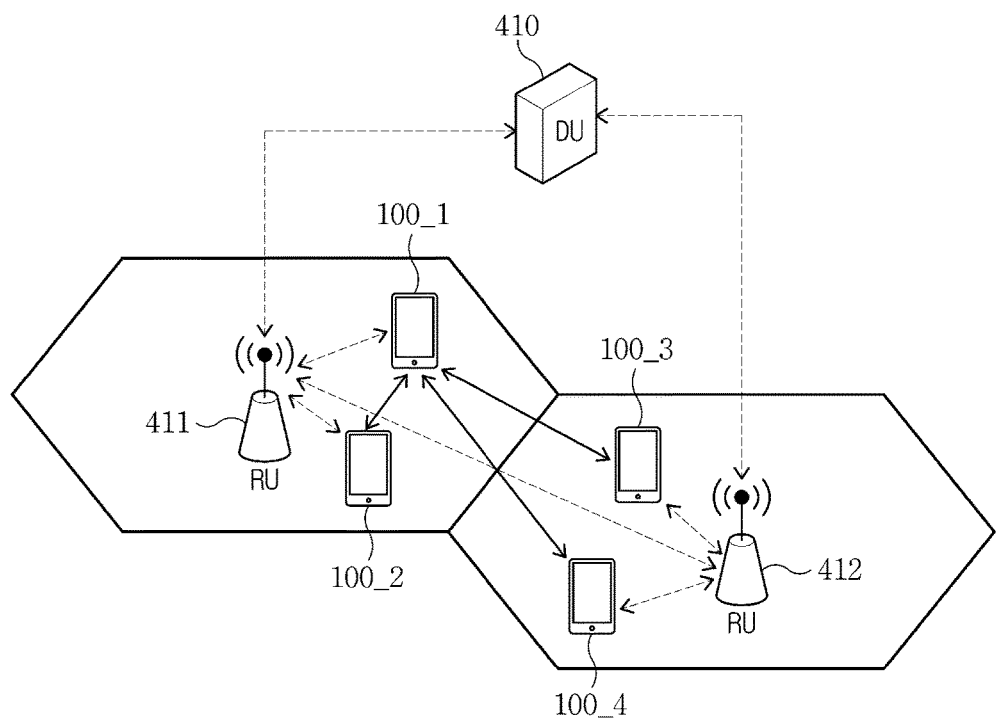
FIG. 2 is an exemplary diagram illustrating a method for discovering a neighboring device according to one or more embodiments.

FIG. 2 is an exemplary diagram illustrating a method for discovering a neighboring device according to one or more embodiments.

The access network forming the communication network 400 of the present disclosure may be implemented with one or more base station apparatuses for transmitting/receiving data. This base station apparatus may be formed of a radio unit (RU), e.g., circuitry, for processing a radio signal, and a digital unit (DU), e.g., circuitry, for converting a radio signal into digital data and performing data processing according to a communication protocol. The RU is also referred to as a remote radio head (RRH), and the DU is also referred to as a base band unit (BBH).

The RU and the DU may be implemented integrally at the same place or constructed separately at remote places through while connecting through a fiber-optic cable, a cable, or the like. Recently, the latter structure is widely used in view of lower network construction cost and high-convenient operation.

FIG. 2 shows the access network based on the latter structure. Referring to FIGS. 1 and 2, the access network may be configured to include the RUs 411 and 412 each of which is installed in each of cells, into which a service target area is divided in the unit of communication coverage, and performs radio access and data transmission/reception with the devices 100_1~100_4 located in the communication coverage of corresponding cell, and the at least one DU 410 which is connected to the RUs 411 and 412 and performs processing of radio data received to or to be transmitted from the RUs 411 and 412.

There may be a plurality of the DU 410, which may be connected as one group to the serving gateway (not shown) located in the core network.

Additionally, the DU 410 may be connected to the RUs 411 and 412. The adjacent RUs 411 and 412 is not always connected to the same DU.

Based on this structure of the communication network 400, the devices 100_1~100_4 may perform a process of discovering neighboring devices through interworking with the RUs 411 and 412 and the DU 410. At this time, in order to discover neighboring devices, location information about neighboring devices is identified through interworking with the RUs 411 and 412 and the DU 410. Herein, the location information may include cell identification information (Cell ID) for distinguishing cells each of which is communication coverage of each RU 411 or 412, DU identification information (DU ID) for identifying the at least one DU connected to the one or more RUs 411 and 412, and IP information of the device 100. Further, the location information may include one or more of serving gateway identification information (SGW ID) for identifying a serving gateway connected to the DU 410, PDN gateway identification information (PGW ID) for identifying a PDN gateway connected to the one or more serving gateways, communication network operator information, and national information.

The location information of neighboring device may be received from the mobility management apparatus of the core network with which the DU 410 interworks. Also, this location information may be received from the mobility management apparatus via the DU 410 by request.

Each device 100_1~100_4 may identify the location information of neighboring device through the RUs 411 and 412 and the DU 410, and creates a neighboring device list by using the identified information. For example, the first device 100_1 may identify the location information about the second, third and fourth devices 100_2, 100_3 and 100_4 by interworking with the RUs 411 and 412 and the DU 410. Also, the first device 100_1 may create the neighboring device list by inserting IP address information of the second, third and fourth devices 100_2, 100_3 and 100_4 in the neighboring device list.

Additionally, the device 100 according to one or more embodiments of the present disclosure may obtain identification information about at least one other device through a D2D discovery message transmitted or received within a specific range, for example, an accessible D2D communication range of the device 100, or transmit a D2D discovery message within a specific range and then, based on a response message in reply to this, obtain identification information, i.e., IP address information, about at least one other device. Namely, the first device 100_1 may obtain identification information about the second and third devices 100_2 and 100_3 by using a D2D discovery message transmitted or received between the second and third devices 100_2 and 100_3. Also, the first device 100_1 may broadcast a D2D discovery message within a specific range and then, by defining the second and third devices 100_2 and 100_3 as neighboring devices when response messages for the D2D discovery message are received from the second and third devices 100_2 and 100_3, create the neighboring device list.

Additionally, the devices 100_1, 100_2, 100_3 and 100_4 according to one or more embodiments of the present disclosure may set priority of the discovered other device by using the identified location information, and select preferentially other device with higher priority as the neighboring device. For example, priorities may be set in the order of Cell ID, DU ID, SGW ID, PGW ID, communication network operation information, and national information, and the devices 100_1, 100_2, 100_3 and 100_4 may select, as the neighboring device, other device having higher priority. Depending on the set priorities, the devices 100_1, 100_2, 100_3 and 100_4 may also select the neighboring device in the order of devices located in the same cell, the same DU, the same serving gateway, the same PDN gateway, the same operator network, and the same nation.

Additionally, when creating the neighboring device list, the devices 100_1, 100_2, 100_3 and 100_4 according to one or more embodiments of the present disclosure may calculate a content delivery quality factor between devices the location information of which is identified, select other device having the calculated content delivery quality factor greater than a given value, and then create the neighboring device list. The content deliver quality factor may be calculated using received signal strength or signal to noise ratio (SNR).

Hereinafter, main elements and operating method of the device 100 according to one or more embodiments of the present disclosure will be described.

Figure 3:
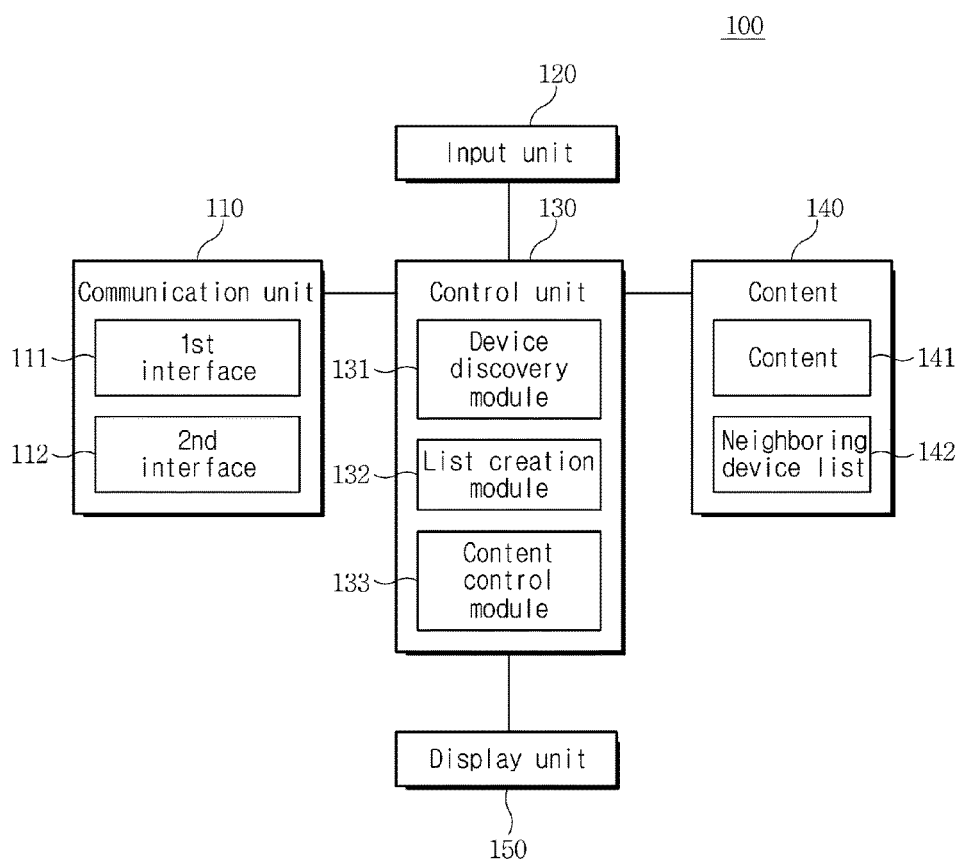
FIG. 3 is an exemplary block diagram illustrating main elements of a device shown in FIG. 1 according to one or more embodiments.

FIG. 3 is an exemplary block diagram illustrating main elements of a device shown in FIG. 1 according to one or more embodiments.

Referring to FIGS. 1 and 3, the device 100 according to one or more embodiments of the present disclosure is configured to include a communication unit 110, an input unit 120, a control unit 130, a memory unit 140, and a display unit 150.

Specifically, the communication unit 110, e.g., circuitry, performs a function of supporting transmission and reception of various kinds of information. The communication unit 110 according to one or more embodiments of the present disclosure may be configured to have a first interface 111 for supporting D2D communication, and a second interface 112 for supporting access to the communication network 400. Among them, the first interface 111 may be activated under the control of the control unit 130 and then perform a process of discovering neighboring devices.

On the other hand, the second interface 112 may transmit a domain query message to the service control apparatus 200 via the communication network 400 under the control of the control unit 130 and then receive a response message in reply to the domain query message. Also, the second interface 112 may transmit a content request message to the content providing apparatus 300 via the communication network 400 and then receive content with a response message in reply to the content request message.

The input unit 120 delivers, to the control unit 130, various kinds of information entered by a user, and a signal entered in connection with setting of various functions and function control of the device 100. Particularly, the input unit 120 of the present disclosure may activate the first interface 111 or support an input of uniform resource locator (URL) for a content request.

The input unit 120 may include a key input tool such as a keyboard or a keypad, a touch input tool such as a touch sensor or a touch pad, a voice input tool, and a gesture input tool having at least one of a gyro sensor, a geomagnetic sensor, an acceleration sensor, a proximity sensor and a camera. Besides, all kinds of input tools being developed or to be developed may be included.

The control unit 130 performs the whole control of the device 100. In view of hardware, the control unit 130 may be configured to include at least one processor such as a central processing unit (CPU) and a micro processing unit (MPU), an execution memory (e.g., a register and/or a random access memory (RAM)) onto which memory loading data is loaded, and a bus for inputting or outputting data to or from the processor and the memory. In view of software, the control unit 130 may be configured to include a program routine or program data that is loaded onto the execution memory from a recording medium so as to perform a function defined in the device 100 and is then processed by the processor. Namely, among functions equipped in the device 100 so as to process the method for content delivery between devices according to one or more embodiments of the present disclosure, any element being processable by means of software is considered as a function of the control unit 130.

The control unit 130 of the present disclosure is functionally connected to one or more elements equipped to support the method for content delivery between devices through interworking with the service control apparatus 200 according to one or more embodiments of the present disclosure. Namely, the control unit 130 is functionally connected to the communication unit 110, the input unit 120, the memory unit 140 and the display unit 150 and controls the supply of power to each element and a flow of signals for performing functions.

The control unit 130 according to one or more embodiments of the present disclosure may perform a process of discovering neighboring devices and creating a neighboring device list about the discovered neighboring devices. Herein, the neighboring device list may be created in response to a request for specific content or when the first interface 111 of the communication unit 110 is activated.

For creation of the neighboring device list, the control unit 130 of the present disclosure may obtain identification information about at least one other device through a D2D discovery message transmitted or received within a specific range, transmit a D2D discovery message within a specific range and then, based on a response message in reply to this, obtain identification information about at least one other device, or obtain identification information about at least one other device through interworking with the DU connected with one or more RUs located in an access network accessed by the device. Then the control unit 130 may create the neighboring device list by defining the obtained identification information about other device as the neighboring device. The neighboring device list of the present disclosure may contain, as identification information, IP address information about neighboring device.

The control unit 130 according to one or more embodiments of the present disclosure may create the neighboring device list by selecting, from among the discovered devices, only the device having a content delivery quality factor greater than a given value. For this, the control unit 130 of the present disclosure may transmit a signal for calculation of a content delivery quality factor to the discovered other device and then calculate the content delivery quality factor by computing a delivery rate, etc. based on a response. Namely, the control unit 130 may calculate the content delivery quality factor by using received signal strength, SNR, or the like. Also, when selecting neighboring devices, the control unit 130 of the present disclosure may query the discovered other device about whether there is any other device connected thereto. If a response indicates that there is any other device connected to the discovered other device, this device may be excluded from the selection of neighboring devices. Namely, the control unit 130 may preferentially select, as the neighboring device, a certain device having no or less connection with other device.

Additionally, when the neighboring device list is created, the control unit 130 transmits the list to the service control apparatus 200 together with the domain query message for content.

Thereafter, as a response to the domain query message, the service control apparatus 200 transmits, to the device 100, information about a content providing device capable of providing content from among neighboring devices contained in the neighboring device list.

The control unit 130 of the device 100 may receive information about the content providing devices from the service control apparatus 200 and also receive content from one of the content providing devices by request.

On the other hand, if there is no neighboring device as a result of search, the control unit 130 may transmit only the domain query message for content to the service control apparatus 200 and, as a response to this, receive address information about the content providing apparatus 300 that provides the content. Namely, if there is no neighboring device which is adjacent to the device 100, the control unit 130 may receive and use content in accordance with a normal content delivery procedure.

If content of the present disclosure is specific content—paid content—that requires authentication information, the control unit 130 may receive authentication information about the content from the service control apparatus 200 or the content providing apparatus 300, then transmit the received authentication information to the content providing device, and receive the content.

Specifically, if a user purchases specific paid content, the control unit 130 may transmit information associated with the purchase of content to the service control apparatus 200 together with the neighboring device list when sending the domain query message for the content to the service control apparatus 200. Herein, the information associated with the purchase of content is utilized as authentication information.

The control unit 130 receives, from the service control apparatus 200, authentication information provided by the content providing apparatus 300 and information about the content providing device capable of providing content from among neighboring devices contained in the neighboring device list. Also, the control unit 130 may transmit the authentication information together when sending a request for content to the content providing device, and then receive the content.

As another example, let's suppose that a user receives, as a gift, specific paid content from other user. The control unit 130 of the present disclosure may transmit a content request message to the content providing apparatus 300 that provides the paid content, and then receive, from the content providing apparatus 300, authentication information about the paid content and information about a content providing device that gives the paid content as a gift. Then the control unit 130 may transmit the authentication information to the content providing device and receive the paid content from the content providing device by request.

Additionally, the control unit 130 according to one or more embodiments of the present disclosure may store temporarily or permanently content provided by the content providing apparatus 300, and transmit the stored content to other device in response to a request of the other device.

In order to perform the above process, the control unit 130 according to one or more embodiments of the present disclosure may be configured to include a device discovery module 131, a list creation module 132, and a content control module 133.

The memory unit 140 may temporarily store programs, required for the operation of functions according to one or more embodiments of the present disclosure, and various data created during the execution of the programs. Particularly, the memory unit 140 according to one or more embodiments of the present disclosure may store content 141. Also, the memory unit 140 may store a neighboring device list 142 created by the control unit 130. Information stored in the memory unit 140 may be maintained temporarily or permanently.

The memory unit 140 may include mainly a program region and a data region. The program region stores information associated with the operation of the device 100, such as an operating system (OS) for booting the device 100. The data region stores data created by the use of the device 100, and may store the content 141 and the neighboring device list 142 as mentioned above. The memory unit 140 may be formed of storage media such a flash memory, a hard disk, a multimedia card micro type memory (e.g., SD or XD memory, etc.), RAM, and ROM.

The display unit 150 displays a series of operating states and operating results produced during the execution of functions of the device 100. Particularly, the display unit 150 of the present disclosure may display various kinds of information associated with the use of content.

The display unit 150 may be implemented in the form of a single touch panel (or touch screen) together with the input unit 120. In this case, the display unit 150 may display various kinds of information produced according to user's touch action.

Additionally, the display unit 150 may be formed of a liquid crystal display (LCD), a thin film transistor LCD (TFT-LCD), an organic light emitting diodes (OLED), an LED, an active matrix organic LED (AMOLED), a flexible display, a 3-dimensional display, or the like. Some of them may have a transparent or light-penetrate form. This may be configured in the form of transparent display including transparent OLED (TOLED).

Hereinbefore, main elements of the device 100 shown in FIG. 3 are described. These elements shown in FIG. 3 are, however, not essential, and more or less elements than shown may be used for the device 100. For example, the device 100 may further include an audio output unit (not shown) for converting an audio signal into analog signal and then outputting the signal. This audio output signal may perform a function of supporting the output of various kinds of information associated with content.

Additionally, the elements of the devices 100 shown in FIG. 3 may be changed in locations for any reason. Although only the device discovery module 131, the list creation module 132 and the content control module 133 are shown as modules for constituting the control unit 130, this is exemplary and any other module for performing any other function may be used for the control unit 130.

Hereinbefore, the main elements and operating method of the device 100 according to one or more embodiments of the present disclosure are described. The device 100 of the present disclosure may be implemented in various forms. For example, the device 100 disclosed herein may be a mobile device such as a smart phone, a tablet PC, a PDA (Personal Digital Assistant), a PMP (Portable Multimedia Player), an MP3 player, and the like, or a stationary device such as a smart TV, a desktop computer, and the like.

According to a recent trend of convergence in digital devices, a great variety of mobile devices or their equivalences may be used as the device 100 of the present disclosure. Furthermore, any device that can communicate between devices and transmit or receive information to or from the service control apparatus 200 or the content providing apparatus 300 may be used as the device 100 of the present disclosure.

Hereinafter, main elements and operating method of the service control apparatus 200 according to one or more embodiments of the present disclosure will be described.

Figure 4:
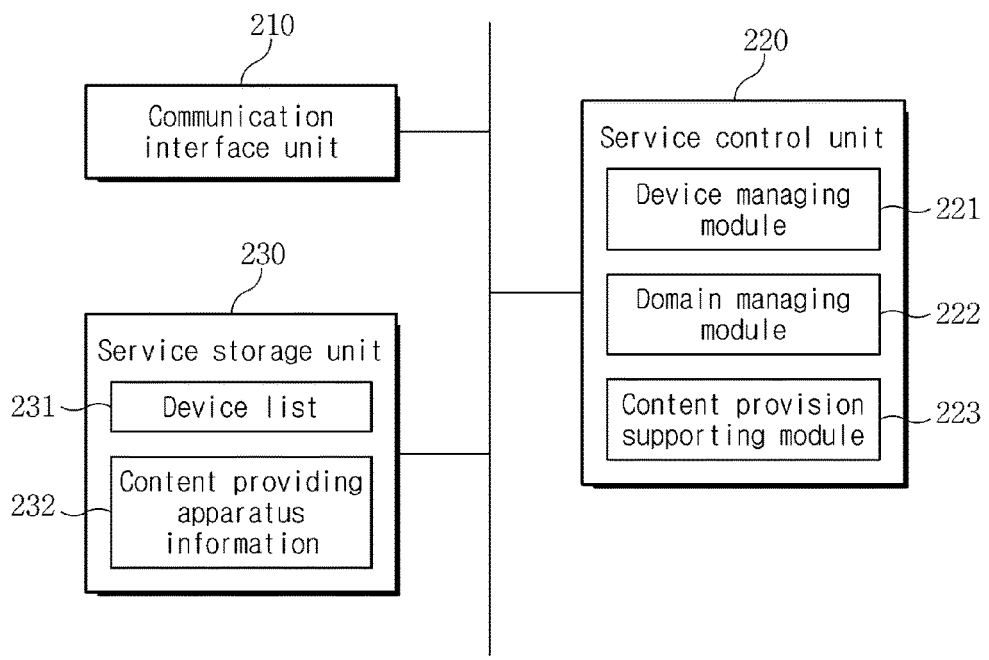
FIG. 4 is an exemplary block diagram illustrating main elements of a service control apparatus shown in FIG. 1 according to one or more embodiments.

FIG. 4 is an exemplary block diagram illustrating main elements of a service control apparatus shown in FIG. 1 according to one or more embodiments.

Referring to FIGS. 1 and 4, the service control apparatus 200 according to one or more embodiments of the present disclosure may be configured to include a communication interface unit 210, a service control unit 220, and a service storage unit 230.

The communication interface unit 210 supports a function of transmitting or receiving information to or from the one or more devices 100 through the communication network 400. Particularly, the communication interface unit 210 of the present disclosure may receive a domain query message from one of the device 100 and then transmit a response message to the device 100.

The service control unit 220 performs the whole control of the service control apparatus 200 according to one or more embodiments of the present disclosure.

Particularly, the service control unit 220 according to one or more embodiments of the present disclosure may receive the domain query message, for content, containing a neighboring device list from one of the devices 100. Herein, the domain query message may contain URL information about specific content, and the service control unit 220 may provide, to the device 100, address information, as a response message in reply to the domain query message, about the content providing apparatus 300 that provides the content for each URL information.

When transmitting the response message, the service control unit 220 may check whether there is a neighboring device, from among neighboring device contained in the neighboring device list, which sends the same domain query message as that for the content within a given time. If there is such a neighboring device, the service control unit 220 designates the neighboring device as a content providing device and then offers it to the device 100 rather than transmitting address information about the content providing apparatus 300 as a response to the domain query message. Namely, if information about a device that sends the domain query message for specific content within a given time such as thirty seconds or three minutes and then receives the response message exists in the neighboring device, the service control unit 220 according to one or more embodiments of the present disclosure may designate the neighboring device as the content providing device and then transmit it to the device 100 rather than returning address information about the content providing apparatus 300 for the content.

Additionally, when the domain query message only is received from the device 100, the service control unit 220 according to one or more embodiments of the present disclosure may return address information, as the response message in reply to the domain query message, about the content providing apparatus 300 to the device 100.

Additionally, if any content requested by the device 100 is incapable of transmission between devices even though the domain query message containing the neighboring device list is received from the device 100, the service control unit 220 of the present disclosure may return, as the response message, address information about the content providing apparatus 300 to the device 100. Herein, content incapable of transmission between devices may be content having excessively greater volume or requiring reliability guarantee.

Also, in response to a request of the device 100, the service control unit 220 according to one or more embodiment of the present disclosure performs a procedure of identifying authentication information about content requested by the device 100 while interworking with the content providing apparatus 300.

In order to perform the above process, the service control unit 220 may be configured to include a device managing module 221, a domain managing module 222, and a content provision supporting module 223.

The service storage unit 220 stores all programs associated with the execution of functions of the service control apparatus 200. Particularly, the service storage unit 220 according to the present disclosure stores various kinds of information associated with a service provided to the device 100. For example, in order to provide a response to a domain query, the service storage unit 220 may store and manage information 232 about the content providing apparatus 300 which is mapped according to URL.

Additionally, the service storage unit 220 may store and manage the domain query message received from the device 100 and related response message in the form of a device list 231 for each device.

The service storage unit 220 of the present disclosure may be a storage area located in the service control apparatus 200, or a data storage server which is located at the outside of the service control apparatus 200 and capable of data transmission/reception with the service control apparatus 200.

Hereinbefore, the main element and operating method of the service control apparatus 200 according to one or more embodiments of the present disclosure are described.

In view of hardware, the service control apparatus 200 according to one or more embodiments of the present disclosure has the same configuration as a known web server or network server. However, in view of software, the service control apparatus 200 includes a program module having codes written in computer languages such as C, C++, Java, Visual Basic, Visual C, and the like. The service control apparatus 200 may be implemented in the form of a web server or network server.

Particularly, the service control apparatus 200 according to one or more embodiments of the present disclosure is implemented to include a domain name server function, and also the configuration of the present disclosure may be implemented in the form of module in the domain name server. Additionally, the web server or network server refers to a computer system, or computer software (web server program) installed therefor, which is connected with many unspecified clients and/or other servers through an open-type computer network such as Internet, receives a task request from such a client or other web server, and provides a task result. However, the web server or network server should be understood as a broader concept including a series of application programs running thereon as well as the above-mentioned web server program and further including, in a certain case, various kinds of database constructed therein. The service control apparatus 200 may be implemented using various web server programs offered depending on the OS such as DOS, Windows, Linux, Unix, Macintosh, etc. in hardware for a known server. Representatively, Website or IIS (Internet Information Server) used in the Windows environment and CERN, NCSA, APPACH, etc. used in the UNIX environment may be used. Also, the service control apparatus 200 may store and manage service registration information in membership database, which may be implemented in an inner or output space of the service control apparatus 200. In this case, the database implemented in the inner space of the service control apparatus 200 may be the service storage unit 230.

Additionally, the service control apparatus 200 of the present disclosure may be implemented with one or more servers that operate in a server-based computing manner or cloud manner. Particularly, information transmitted or received through the system 1000 of the present disclosure is offered through a cloud computing function which may be stored permanently in a cloud computing device on Internet.

Meanwhile, a memory or storage equipped in the device 100 or the service control apparatus 200 stores information therein. In embodiments, the memory or storage is a computer-readable medium. The memory or storage may be a volatile memory unit in one embodiment and may be a nonvolatile memory unit in another embodiment. In various embodiments, the memory or storage may include, for example, a hard disk device, an optical disk device, or any other high-volume storage device.

In addition, the term "module" used herein may refer to a component or device which is formed of software, hardware, or combination thereof, and performs certain tasks. A module may include, for example, components, such as software components, object-oriented software components, class components and task components, processes, functions, attributes, procedures, subroutines, segments of program code, drivers, data, databases, data structures, tables, arrays, and variables. The functionality provided for in the components and modules may be combined into fewer components and modules or further separated into additional components and modules.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to the present disclosure or allow execution thereby. A computer-readable medium may be a machine-readable storage device, a machine-readable storage board, a memory device, a machine-readable composition of material affecting wave-type signaling, or a combination thereof.

Hereinafter, a method for content delivery between devices through interworking with the service control apparatus according to one or more embodiments will be described.

Figure 5:
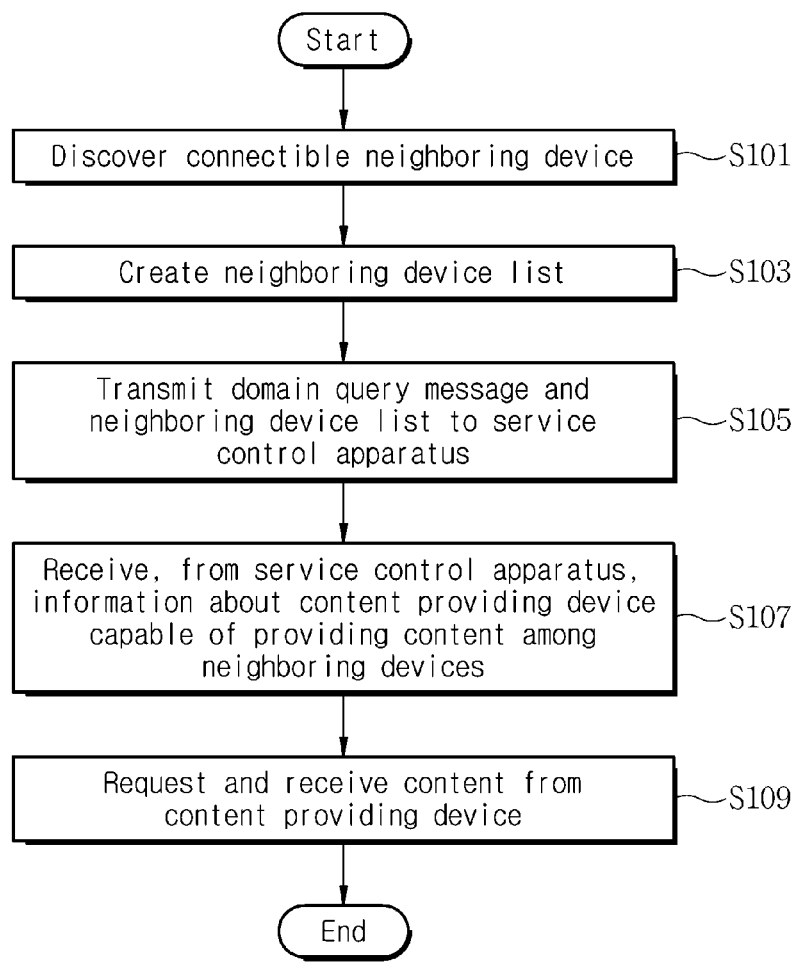
FIG. 5 is an exemplary flow diagram illustrating a method for content delivery between devices through interworking with a service control apparatus according to one or more embodiments.

FIG. 5 is an exemplary flow diagram illustrating a method for content delivery between devices through interworking with a service control apparatus according to one or more embodiments.

Referring to FIGS. 1 and 5, the method for content delivery between the devices through interworking with the service control apparatus according to one or more embodiments of the present disclosure begins with a process of discovering connectible neighboring devices at the device 100 (S101). Herein, this process of discovering the neighboring devices may be performed through activation of an interface module equipped in the device and supporting the D2D communication function or may be performed in response to a user's request.

Then, the device 100 creates a neighboring device list about the discovered neighboring devices (S103).

Thereafter, the device 100 transmits a domain query message for specific content, including the neighboring device list, to the service control apparatus 200 (S105). Then the device 100 receives, from the service control apparatus 200, information about a content providing device, from among neighboring devices, capable of providing the content (S107).

For example, if the second and third devices 100_2 and 100_3 are neighboring devices discovered by the first device 100_1, the first device 100_1 may receive, from the service control apparatus 200, information about the second device 100_2, from among the neighboring devices, which is designated as a content providing device capable of providing content.

Thereafter, the device 100 may receive content from the content providing device by request.

Hereinafter, the method for content delivery between the devices through interworking with the service control apparatus according to embodiments of the present disclosure will be described in more detail with reference to FIGS. 6 to 8.

Before description, although it is supposed that the first device 100_1 is a device for discovering neighboring devices and also the second device 100_2 is a device discovered by the first device 100_1, this is exemplary and not to be construed as a limitation. Also, repeated description will be omitted.

Figure 6:
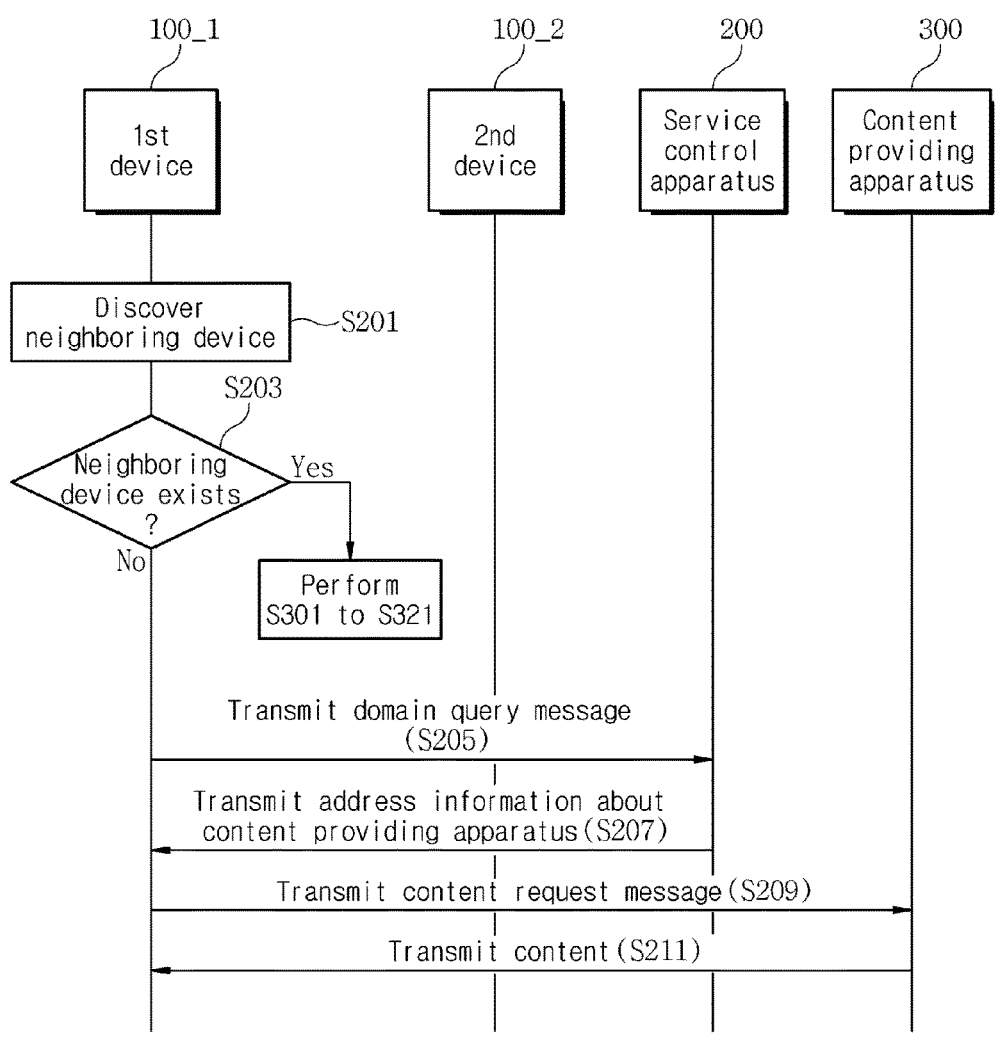
FIG. 6 is an exemplary flow diagram illustrating a method for content delivery between devices through interworking with a service control apparatus according to one or more embodiments.

FIG. 6 is an exemplary flow diagram illustrating a method for content delivery between devices through interworking with a service control apparatus according to one embodiment of the present disclosure.

Referring to FIG. 6, at the outset, the first device 100_1 searches for neighboring devices in response to the activation of an interface module for supporting the D2D communication function or in response to a user's request (S201).

Herein, the first device 100_1 may obtain identification information about at least one other device through a D2D discovery message transmitted or received within a specific range, obtain identification information about at least one other device based on a response message in reply to transmission of a D2D discovery message within a specific range, or obtain identification information about at least one other device through interworking with the DU connected with one or more RUs located in an access network accessed by the device, and then discover the neighboring devices.

If there is no neighboring device as a result of search, the first device 100_1 may transmit a domain query message for specific content to the service control apparatus 200 that performs a domain name server function (S205).

Additionally, as a response to this, the first device 100_1 may receive, from the service control apparatus 200, address information about the content providing apparatus 300 for the content. Herein, the service control apparatus 200 may store the response message in reply to the domain query message, transmitted by the first device 100_1, by correlating it with the first device 100_1.

Additionally, the first device 100_1 transmits a content request message to the identified content providing apparatus 300 (S209). Herein, the content request message may be, e.g., an HTTP GET message. Thereafter, as a response to this, the first device 100_1 may receive content from the content providing apparatus 300 (S211). Herein, the response message in reply to the content request message may be, e.g., an HTTP RESPONSE message.

Meanwhile, a case in which there is any neighboring device as a result of search at step S203 will be described with reference to FIG. 7.

Figure 7:
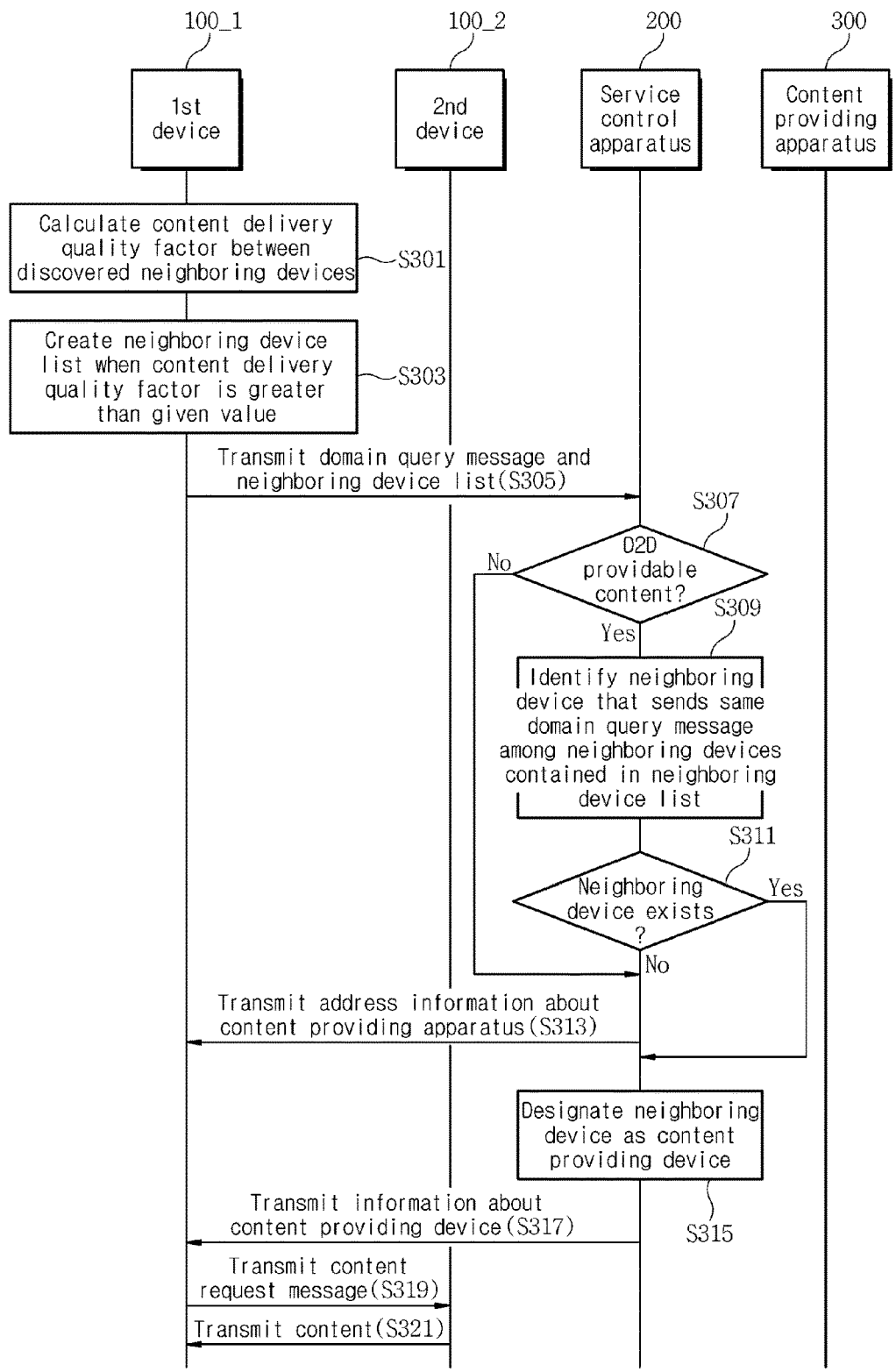
FIG. 7 is an exemplary flow diagram illustrating a method for content delivery between devices through interworking with a service control apparatus according to one or more embodiments.

FIG. 7 is an exemplary flow diagram illustrating a method for content delivery between devices through interworking with a service control apparatus according to another embodiment of the present disclosure.

Referring to FIG. 7, when any neighboring device is discovered, the first device 100_1 creates a list about the neighboring device. At this time, the first device 100_1 may create a neighboring device list having all the discovered neighboring devices, or create the neighboring device list of specific devices only selected through calculation of a content delivery quality factor.

In other words, the first device 100_1 calculates a content delivery quality factor between the discovered devices (S301). If the second, third and fourth devices 100_2, 100_3 and 100_4 are discovered in FIG. 2, the first device 100_1 calculates the content delivery quality factor between the first and second devices 100_1 and 100_2, between the first and third devices 100_1 and 100_3, and between the first and fourth devices 100_1 and 100_4. Namely, the first device 100_1 may transmit a signal to each discovered device and then, by using received signal strength of a response signal, calculate the content delivery quality factor. Also, the first device 100_1 may calculate SNR and use this as the content delivery quality factor. Additionally, the first device 100_1 may select a neighboring device only when the content delivery quality factor is greater than a given value, and then create the neighboring device list containing the selected neighboring device (S303).

Also, the first device 100_1 may identify the number of currently connected to each device, select a neighboring device only when given numbers of the connected devices or less are connected, and create the neighboring device list.

Then, the first device 100_1 transmits a domain query message including the created neighboring device list to the service control apparatus 200 that performs the domain server function (S305).

The service control apparatus 200 performs a process of determining whether content requested by the first device 100_1 is D2D providable content (S307). At this time, if the content requested by the first device 100_1 has greater volume or requires guarantee of reliable transmission, the service control apparatus 200 returns address information about the content providing apparatus 300 (S313).

On the other hand, in case of content allowing D2D content provision, the service control apparatus 300 may perform a process of checking whether any neighboring device that sends the same domain query message within a given time exists in neighboring devices contained in the neighboring device list (S309). At this time, the service control apparatus 200 may also check whether any neighboring device that sends the same domain query message within a given time exists in the same cell.

If any corresponding neighboring device exists as a result of check (S311), the service control apparatus 200 may designate the neighboring device as a content providing device (S315) and then transmit address information about the content providing device, e.g., the second device 100_2, to the first device 100_1 (S317).

Then the first device 100_1 transmits a content request message to the second device 100_2 and then receives content from the second device 100_2 without passing through the communication network 400 (S321).

On the other hand, if no neighboring device exists as a result of check at S311, the service control apparatus 200 may transmit address information about the corresponding content providing apparatus 300 as a response in reply to the domain query message of the first device 100_1.

Next, a case in which content requested by the first device 100_1 requires authentication information will be described. For convenience, let's suppose that the first device 100_1 receives a gift message for paid content from the second device 100_2.

FIG. 8 is an exemplary flow diagram illustrating a method for content delivery between devices through interworking with a service control apparatus according to still another embodiment of the present disclosure.

Referring to FIG. 8, as discussed above, the first device 100_1 may discover neighboring devices (S401) and then create a neighboring device list (S403).

In this case, the first device 100_1 may receive, from the second device 100_2, a gift message for paid content which is purchased by a user of the second device 100_2. For example, let's suppose that the first device 100_1 receives, from the second device 100_2, a URL message capable of downloading paid content.

Meanwhile the above steps of discovering the neighboring devices and creating the neighboring device list may be performed after step S405.

Then, in order to receive corresponding content, the first device 100_1 sends a domain query message for the content and the created neighboring device list to the service control apparatus 200 (S407).

Then the service control apparatus 200 identifies information about the content providing apparatus 300 that provides the content requested by the first device 100_1, and may request the corresponding content providing apparatus 300 to authenticate whether the content gift message received from the second device 100_2 by the first device 100_1 is a normal gift message (S409).

The content providing apparatus 300 checks authentication information by determining whether the second device 100_2 purchases the content, and the like, and if it is determined that the content is purchased, transmits this to the service control apparatus 200.

The service control apparatus 200 that receives authentication information from the content providing apparatus 300 checks whether any neighboring device that sends the same domain query message within a given time exists in neighboring device contained in the neighboring device list (S413). If such neighboring device does not exist (S415), the service control apparatus 200 may transmit, to the first device 100_1, information about the second device 100_2 that offers content as a gift, or information about the content providing apparatus 300 (S417). If there is any neighboring device at step S415, namely, if any neighboring device, i.e., the third device 100_3, which receives the same content as requested by the first device 100_1 within a given time exists even though the second device 100_2 offers a content gift, the service control apparatus 200 may identify this and then transmit authentication information and information about the third device 100_3 to the first device 100_1 such that the first device may receive the content from the third device 100_3 (S419).

Then the first device 100_1 transmits a content request message together with the authentication information to the third device 100_3 (S421), and the third device 100_3 may offer the content to the first device 100_1 (S423).

As discussed hereinbefore, according to the D2D content delivery method through interworking with the service control apparatus 200 of the present disclosure, by supporting content transmission between devices through interworking with the service control apparatus having the domain name server function, it is possible to more easily discover a device to be connected in a D2D communication manner. Therefore, the procedure for D2D communication may be simplified.

In addition, according to the present disclosure, by identifying control information such as authentication information for transmission/reception of content through interworking with the service control apparatus, and also by transmitting/receiving actual content between devices, it is possible to transmit or receive content including authentication information and also perform transmission/reception of more reliable content through intervention of the service control apparatus 200.

Hereinbefore, the method for content delivery between devices through interworking with the service control apparatus according to embodiments of the present disclosure is described.

The above-discussed method for content delivery between devices through interworking with the service control apparatus of the present disclosure may be recorded in the non-transitory computer-readable storage medium which includes magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), a flash memory, an erasable programmable ROM (EPROM), and an electrically EPROM (EEPROM). A processor and memory may be supplemented by or integrated with specific-purpose logical circuit. Program commands may include high-class language codes, which can be executed in a computer by using an interpreter, as well as machine codes made by a compiler. The aforementioned hardware device may be configured to operate as one or more software modules in order to perform the operation of the present disclosure, and vice versa.

Although the various embodiments of the present disclosure have been described, it is understood that the present disclosure should not be limited to these embodiments but various changes and modifications can be made by one ordinarily skilled in the art within the subject matter, the spirit and scope of the present disclosure as hereinafter claimed. Specific terms used in the present disclosure and drawings are used for illustrative purposes and not to be considered as limitations of the present disclosure.

The invention claimed is:

1. A method for content delivery between devices through interworking with a service control apparatus, the method performed by a device, the method comprising:
   creating a neighboring device list containing connectable neighboring devices by searching for the connectable neighboring devices;
   transmitting, to the service control apparatus via a network, the created neighboring device list and a domain query message for content;
   receiving, from the service control apparatus and as a response to the transmitted domain query message, information on a content providing device for providing the content among the connectable neighboring devices contained in the neighboring device list; and
   requesting and receiving the content from the content providing device,
   wherein the content providing device is a neighboring device transmitting, to the service control apparatus and within a predetermined time, the same domain query message as the domain query message transmitted by the device.

2. The method of claim 1, wherein said creating the neighboring device list comprises:
   obtaining identification information on the connectable neighboring devices from a Device-to-Device (D2D) discovery message and a response message responsive to the D2D discovery message transmitted from a plurality of devices in specific range or obtaining identification information on the connectable neighboring devices through interworking with a digital unit (DU) connected to one or more radio units (RUs) located in an access network accessed by the device; and
   creating, based on the obtained identification information, the neighboring device list containing the connectable neighboring devices.

3. The method of claim 1, wherein said creating the neighboring device list includes:
   searching for the connectable devices;
   calculating a content delivery quality factor between the discovered connectable devices discovered by said searching; and
   creating the neighboring device list by selecting, from the discovered connectable devices, at least one connectable neighboring device having the calculate content delivery quality factor greater than a reference value.

4. The method of claim 1, further comprising:
   when no connectable neighboring device is discovered during the creating of the neighboring device list,
      transmitting the domain query message for the content to the service control apparatus via the network;
      receiving, from the service control apparatus via the network and as a response to the transmitted domain query message, address information on a content providing apparatus for providing the content; and
      requesting and receiving the content from the content providing apparatus.

5. The method of claim 1, further comprising:
   determining whether the content requires authentication information; and
   when the content requires the authentication information,
      transmitting, to the service control apparatus via the network, the domain query message comprising a request for authentication information of the content and the created neighboring device list,
      receiving, from the service control apparatus via the network, authentication information offered by a content providing apparatus for providing the content and the information on the content providing device, and
      requesting the content by transmitting the authentication information to the content providing device and receiving the content from the content providing device.

6. The method of claim 1, further comprising:
   determining whether the content requires authentication information; and
   when the content requires the authentication information,
      transmitting the domain query message for the content to the service control apparatus,
      receiving, from the service control apparatus and as a response to the domain query message, address information of a content providing apparatus,
      transmitting a content request message to the content providing apparatus via the network,
      receiving, from the content providing apparatus, the authentication information on the content and information on a content device for providing the content, and
      requesting and receiving the content from the content providing device.

7. A method for content delivery between devices through interworking with a service control apparatus, the method performed by the service control apparatus, the method comprising:
   receiving, from a device among the devices, a neighboring device list and a domain query message for content;
   checking whether a neighboring device, which sends the same domain query message as the received domain query message within a predetermined time, is contained in the neighboring device list; and
   when the neighboring device is contained in the neighboring device list,
      designating the neighboring device as a content providing device, and
      transmitting, to the device and as a response to the received domain query message, information on the content providing device; and
   when the neighboring device is not contained in the neighboring device list, transmitting, as a response to the received domain query message and to the device, address information on a content providing apparatus for the content.

8. The method of claim 7, further comprising:
   determining whether the content is incapable of content transmission between the devices; and
   when the content is not available at the devices interworking with the service control apparatus, transmitting, to the device and as the response to the received domain query message, address information on the content providing apparatus.

9. The method of claim 8, wherein said determining comprises:
   checking a volume size of the content requested by the device; and
   determining whether the volume size of the content is capable of the content transmission between the devices.

10. The method of claim 8, wherein said determining determines whether the content requires a guarantee of reliable transmission.

\* \* \* \* \*